(12) United States Patent
Ishida

(10) Patent No.: US 7,698,620 B2
(45) Date of Patent: Apr. 13, 2010

(54) INTERLEAVE PARAMETER PROCESSING METHOD

(75) Inventor: Kazuhiro Ishida, Minato-ku (JP)

(73) Assignee: NEC Corporation, Tokyo (JP)

( * ) Notice: Subject to any disclaimer, the term of this patent is extended or adjusted under 35 U.S.C. 154(b) by 921 days.

(21) Appl. No.: 11/064,479

(22) Filed: Feb. 24, 2005

(65) Prior Publication Data

US 2005/0204259 A1     Sep. 15, 2005

(30) Foreign Application Priority Data

Feb. 27, 2004     (JP)     ............... 2004-053923

(51) Int. Cl.
*H03M 13/00*     (2006.01)

(52) U.S. Cl. ............... 714/755; 714/756; 714/702

(58) Field of Classification Search ............... 714/755, 714/756, 702
See application file for complete search history.

(56) References Cited

U.S. PATENT DOCUMENTS

| | | | | |
|---|---|---|---|---|
| 6,675,347 | B1 * | 1/2004 | Razoumov et al. | 714/790 |
| 6,845,482 | B2 * | 1/2005 | Yao et al. | 714/755 |
| 7,028,230 | B2 * | 4/2006 | Manninen et al. | 714/702 |
| 2002/0159423 | A1 * | 10/2002 | Yao et al. | 370/342 |

FOREIGN PATENT DOCUMENTS

| | | |
|---|---|---|
| JP | 2001-216289 A | 8/2001 |
| JP | 2001-267934 A | 9/2001 |
| JP | 2002-190743 A | 7/2002 |
| JP | 2003-500885 A | 1/2003 |
| JP | 2003-533945 A | 11/2003 |
| JP | 2005-72843 A | 3/2005 |

OTHER PUBLICATIONS

Garello, R.; Pierleoni, P and Bendetto, S, Computing the free distance of turbo codes and serially concatentated codes with interleavers: algorithms and applications, May 2001, IEEE, vol. 19, p. 801-806.*

Suda, H. et al., "An Embedded Interleaver for Turbo Codes Based on Prime-Field", The Transactions of the Institute of Electronics, Information and Communication Engineers, Nov. 2002, pp. 1168-1181, vol. J85-A, No. 11.

* cited by examiner

*Primary Examiner*—M. Mujtaba K Chaudry
*Assistant Examiner*—Enam Ahmed
(74) *Attorney, Agent, or Firm*—Sughrue Mion, PLLC

(57) ABSTRACT

A calculation is facilitated for $y[i]=q[i] \times \mod(p-1)$ which is required as an intermediate value when calculating intra-row permutation pattern $U[i][j]$, which is a parameter for use by an interleaver for on a turbo code defined in a standard 3GPP TS25.212 of IMT 2000, from prime number p, base sequence s[j], inter-row permutation pattern T[i], and prime number sequence q[i]. First, index i and variable div are initialized to zero. When $q[i] \geq \text{div}+p-1$, p−1 is added to the value of div. When $q[i] < \text{div}+p-1$, y[i] is calculated in accordance with $y[i]=q[i]-\text{div}$. Index i is incremented and the foregoing processing is repeated until i reaches R.

8 Claims, 6 Drawing Sheets

Fig. 1A (Prior Art)

| p | 23 | 29 | 43 | 47 | 53 | 59 | 67 | 79 | 83 | 103 | 107 | 113 | 127 | 131 |
|---|---|---|---|---|---|---|---|---|---|---|---|---|---|---|
| q[0] | 1 | 1 | 1 | 1 | 1 | 1 | 1 | 1 | 1 | 1 | 1 | 1 | 1 | 1 |
| q[1] | 7 | 11 | 11 | 7 | 7 | 7 | 7 | 7 | 7 | 7 | 7 | 11 | 11 | 7 |
| q[2] | 13 | 13 | 13 | 11 | 11 | 11 | 13 | 11 | 11 | 11 | 11 | 13 | 13 | 11 |
| q[3] | 17 | 17 | 17 | 13 | 17 | 13 | 17 | 17 | 13 | 13 | 13 | 17 | 17 | 17 |
| q[4] | 19 | 19 | 19 | 17 | 19 | 17 | 19 | 19 | 17 | 19 | 17 | 19 | 19 | 19 |
| q[5] | 23 | 23 | 23 | 19 | 23 | 19 | 23 | 23 | 19 | 23 | 19 | 23 | 23 | 23 |
| q[6] | 29 | 29 | 29 | 29 | 29 | 23 | 29 | 29 | 23 | 29 | 23 | 29 | 29 | 29 |
| q[7] | 31 | 31 | 31 | 31 | 31 | 31 | 31 | 31 | 29 | 31 | 29 | 31 | 31 | 31 |
| q[8] | 37 | 37 | 37 | 37 | 37 | 37 | 37 | 37 | 31 | 37 | 31 | 37 | 37 | 37 |
| q[9] | 41 | 41 | 41 | 41 | 41 | 41 | 41 | 41 | 37 | 41 | 37 | 41 | 41 | 41 |
| q[10] | 43 | 43 | 43 | 43 | 43 | 43 | 43 | 43 | 43 | 43 | 41 | 43 | 43 | 43 |
| q[11] | 47 | 47 | 47 | 47 | 47 | 47 | 47 | 47 | 47 | 47 | 43 | 47 | 47 | 47 |
| q[12] | 53 | 53 | 53 | 53 | 53 | 53 | 53 | 53 | 53 | 53 | 47 | 53 | 53 | 53 |
| q[13] | 59 | 59 | 59 | 59 | 59 | 59 | 59 | 59 | 59 | 59 | 59 | 59 | 59 | 59 |
| q[14] | 61 | 61 | 61 | 61 | 61 | 61 | 61 | 61 | 61 | 61 | 61 | 61 | 61 | 61 |
| q[15] | 67 | 67 | 67 | 67 | 67 | 67 | 67 | 67 | 67 | 67 | 67 | 67 | 67 | 67 |
| q[16] | 71 | 71 | 71 | 71 | 71 | 71 | 71 | 71 | 71 | 71 | 71 | 71 | 71 | 71 |
| q[17] | 73 | 73 | 73 | 73 | 73 | 73 | 73 | 73 | 73 | 73 | 73 | 73 | 73 | 73 |
| q[18] | 79 | 79 | 79 | 79 | 79 | 79 | 79 | 79 | 79 | 79 | 79 | 79 | 79 | 79 |
| q[19] | 83 | 83 | 83 | 83 | 83 | 83 | 83 | 83 | 83 | 83 | 83 | 83 | 83 | 83 |

Fig. 1B (Prior Art)

| p | 137 | 139 | 149 | 157 | 173 | 191 | 197 | 199 | 211 | 223 | 229 | 233 | 239 | etc |
|---|---|---|---|---|---|---|---|---|---|---|---|---|---|---|
| q[0] | 1 | 1 | 1 | 1 | 1 | 1 | 1 | 1 | 1 | 1 | 1 | 1 | 1 | 1 |
| q[1] | 7 | 7 | 7 | 7 | 7 | 7 | 11 | 7 | 11 | 7 | 7 | 7 | 11 | 7 |
| q[2] | 11 | 11 | 11 | 11 | 11 | 11 | 13 | 13 | 13 | 11 | 11 | 11 | 13 | 11 |
| q[3] | 13 | 13 | 13 | 17 | 13 | 13 | 17 | 17 | 17 | 13 | 13 | 13 | 19 | 13 |
| q[4] | 19 | 17 | 17 | 19 | 17 | 17 | 19 | 19 | 19 | 17 | 17 | 17 | 23 | 17 |
| q[5] | 23 | 19 | 19 | 23 | 19 | 23 | 23 | 23 | 23 | 19 | 23 | 19 | 29 | 19 |
| q[6] | 29 | 29 | 23 | 29 | 23 | 29 | 29 | 29 | 29 | 23 | 29 | 23 | 31 | 23 |
| q[7] | 31 | 31 | 29 | 31 | 29 | 31 | 31 | 31 | 31 | 29 | 31 | 31 | 37 | 29 |
| q[8] | 37 | 37 | 31 | 37 | 31 | 37 | 37 | 37 | 37 | 31 | 37 | 37 | 41 | 31 |
| q[9] | 41 | 41 | 41 | 41 | 37 | 41 | 41 | 41 | 41 | 41 | 41 | 41 | 43 | 37 |
| q[10] | 43 | 43 | 43 | 43 | 41 | 43 | 43 | 43 | 43 | 43 | 43 | 43 | 47 | 41 |
| q[11] | 47 | 47 | 47 | 47 | 47 | 47 | 47 | 47 | 47 | 47 | 47 | 47 | 53 | 43 |
| q[12] | 53 | 53 | 53 | 53 | 53 | 53 | 53 | 53 | 53 | 53 | 53 | 53 | 59 | 47 |
| q[13] | 59 | 59 | 59 | 59 | 59 | 59 | 59 | 59 | 59 | 59 | 59 | 59 | 61 | 53 |
| q[14] | 61 | 61 | 61 | 61 | 61 | 61 | 61 | 61 | 61 | 61 | 61 | 61 | 67 | 59 |
| q[15] | 67 | 67 | 67 | 67 | 67 | 67 | 67 | 67 | 67 | 67 | 67 | 67 | 71 | 61 |
| q[16] | 71 | 71 | 71 | 71 | 71 | 71 | 71 | 71 | 71 | 71 | 71 | 71 | 73 | 67 |
| q[17] | 73 | 73 | 73 | 73 | 73 | 73 | 73 | 73 | 73 | 73 | 73 | 73 | 79 | 71 |
| q[18] | 79 | 79 | 79 | 79 | 79 | 79 | 79 | 79 | 79 | 79 | 79 | 79 | 83 | 73 |
| q[19] | 83 | 83 | 83 | 83 | 83 | 83 | 83 | 83 | 83 | 83 | 83 | 83 | 89 | 79 |

INTERLEAVE PARAMETER PROCESSING METHOD

BACKGROUND OF THE INVENTION

1. Field of the Invention

The present invention relates to an internal interleaver for turbo coding, referred to as a prime number interleaver, which has been normalized in wideband DS-CDMA (W-CDMA) that has been standardized as one of radio access networks (RAN) for a third-generation mobile communication system (IMT2000).

2. Description of the Related Art

Wideband DS-CDMA (W-CDMA) has been standardized as one of radio access networks (RAN) for the third-generation mobile communication system (IMT2000), and a turbo code internal interleaver, referred to as the "prime number interleaver," has been normalized in the standard. Detailed description thereof is disclosed in "3rd Generation Partnership Project; Technical Specification Group Radio Access Network; Multiplexing And Channel Coding (FDD)" (Release 1999), 3GPP TS25. 213 V3.10.0 (2002-06), Section 4.2.3.2.3, Turbo Code Internal Interleaver, pp. 16-19. The following description is based on this document.

In an interleaver for the turbo code normalized in Standard 3GPP TS25.212 of IMT2000 (W-CDMA), intra-row permutation pattern U[i][j], which is indispensable for encoding data to be transmitted, is defined as follows using r[i] which is defined later:

$$U[i][j]=s[(j*r[i])*\mathrm{mod}(p-1)]=s[x[i][j]] \qquad (1)$$

where x[i][j]=(j*r[i])*mod(p−1)

Herein, r[i] is defined as follows using inter-row permutation pattern T[i], and prime number sequence q[i] which is defined later:

$$r[T[i]]=q[i] \qquad (2)$$

Prime number sequence q[i] is defined as follows using the number of rows R and prime number p of the interleaver:

q[0]=1 where q[i] for i=1, 2, ..., R−1, is a minimum prime number which satisfies $$g.c.d(q[i],p-1)=1 \text{ and } q[i]>6, \text{ and } q[i]>q[i-1] \qquad (3)$$

where g. c. d(x,y) is the greatest common divisor of x and y.

Referring to FIGS. 1A and 1B, values for prime number sequence q[i] are exemplified for each value of prime number p when the number of rows R in the interleaver is equal to 20 (R=20).

As described above, intra-row permutation pattern U[i][j] is calculated using prime number p, base sequence s[j], inter-row permutation pattern T[i], and prime number sequence q[i].

In a mobile telephone and the like in IMT2000, a data length is first calculated for data to be transmitted. Then, prime number p, base sequence s[j], inter-row permutation pattern T[i], and prime number sequence q[i] are determined based on the calculated data length (or the size of a matrix for storing the data to be transmitted). Then, intra-row permutation pattern U[i][j] is calculated based on these values. Next, transmission data is encoded based on the calculated intra-row permutation pattern U[i][j] and inter-row permutation pattern T[i], and the encoded transmission data is transmitted to a mobile telephone network. Another mobile telephone which has received the encoded data, decodes the received encoded data based on intra-row permutation pattern U[i][j] and inter-row permutation pattern T[i] which have been calculated in a similar manner.

Prime number p, base sequence s[j], and prime number sequence q[i] can be uniquely determined from the length of data to be transmitted (or the size of a matrix which stores the data to be transmitted). Prime number sequence q[i] has been shown in Equation (3) and FIGS. 1A, 1B. Also, the present applicant has already filed a method of efficiently calculating base sequence s[j] (Japanese Patent Application No. 2003-298493). For inter-row permutation pattern T[i], there are four fixed patterns, any one of which is selected.

As described above, intra-row permutation pattern U[i][j] is calculated using prime number p, base sequence s[j], inter-row permutation pattern T[i], and prime number sequence q[i]. However, for simplifying the calculation, intra-row permutation pattern U[i][j] is typically calculated after y[i], defined as follows, is determined as an intermediate value to calculate intra-row permutation pattern U[i][j]:

$$y[i]=w[i][1]=q[i]*\mathrm{mod}(p-1) \qquad (4)$$

where w[i][j] is defined as follows:

$$w[i][j] = x[T[i]][j] = (j*r[T[i]])*\mathrm{mod}(p-1) \qquad (5)$$
$$= (j*q[i])*\mathrm{mod}(p-1)$$

In the following, description will be made of a method of calculating intra-row permutation pattern U[i][j] according to the prior art, using a specific example.

First, prime number p, base sequence s[j], inter-row permutation pattern T[i], and prime number sequence q[i] are determined from the data length of data to be transmitted. Assume for example that p, s[j], T[i], q[i] have been determined as follows:

Setting Parameters p=7 s[j]=[1,3,2,6,4,5] (j=0-5)

T[i]=[4,3,2,1,0] (i=0-4)(R=5)

q[i]=[1,7,11,13,17] (i=0-4)(R=5)

First, intermediate value y[i] is calculated as follows based on Equation (4), p, q[i]. FIG. 2 shows a flow chart of the procedure to find y[i].

Calculation Process 1 y[0]=q[0]*mod(7−1)=1*mod 6=1 y[1]=q[1]*mod(7−1)=7*mod 6=1 y[2]=q[2]*mod(7−1)=11*mod 6=5 y[3]=q[3]*mod(7−1)=13*mod 6=1 y[4]=q[4]*mod(7−1)=17*mod 6=5

Next, x[i][1] is calculated as follows based on y[i] calculated in Calculation Process 1, T[i], and Equations (4), (5):

Calculation Process 2 y[i]=w[i][1]=x[T[i]][1]

y[0]=w[0][1]=[T[0]][1]=x[4][1]=1 y[1]=w[1][1]=[T[1]][1]=x[3][1]=1

$y[2]=w[2][1]=[T[2]][1]=x[2][1]=5$ $y[3]=w[3][1]=[T[3]][1]=x[1][1]=1$ $y[4]=w[4][1]=[T[4]][1]=x[0][1]=5$

Therefore, $x[i][1]=[5, 1, 5, 1, 1]$ (I=0 to 4) (R=5)

Next, x[i][j] is calculated based on x[i][1] calculated in Calculation Process 2 and prime number p with reference to Equation (1), without performing a remainder calculation, as follows:

Calculation Process 3

$x[0][0]=0$ $x[0][1]=5$ $x[0][2]=x[0][1]+x[0][1]-(p-1)=5+5-6=4$ $x[0][3]=x[0][2]+x[0][1]-(p-1)=4+5-6=3$ $x[0][4]=x[0][3]+x[0][1]-(p-1)=3+5-6=2$ $x[0][5]=x[0][4]+x[0][1]-(p-1)=2+5-6=1$ (Since each of x[0][1]+x[0][1], x[0][2]+x[0][1], x[0][3]+x[0][1], x[0][4]+x[0][1] is larger than p−1, p−1 is subtracted from the value.)

$x[1][0]=0$ $x[1][1]=1$ $x[1][2]=x[1][1]+x[1][1]=1+1=2$ $x[1][3]=x[1][2]+x[1][1]=2+1=3$ $x[1][4]=x[1][3]+x[1][1]=3+1=4$ $x[1][5]=x[1][4]+x[1][1]=4+1=5$ (Since each of x[0][1]+x[0][1], x[0][2]+x[0][1], x[0][3]+x[0][1], x[0][4]+x[0][1] is smaller than p−1, the value is output as is.)

$x[2][0]=0$ $x[2][1]=5$ $x[2][2]=x[2][1]+x[2][1]-(p-1)=5+5-6=4$ $x[2][3]=x[2][2]+x[2][1]-(p-1)=4+5-6=3$ $x[2][4]=x[2][3]+x[2][1]-(p-1)=3+5-6=2$ $x[2][5]=x[2][4]+x[2][1]-(p-1)=2+5-6=1$ (Since each of x[0][1]+x[0][1], x[0][2]+x[0][1], x[0][3]+x[0][1], x[0][4]+x[0][1] is larger than p−1, p−1 is subtracted from the value.)

$x[3][0]=0$ $x[3][1]=1$ $x[3][2]=x[3][1]+x[3][1]=1+1=2$ $x[3][3]=x[3][2]+x[3][1]=2+1=3$ $x[3][4]=x[3][3]+x[3][1]=3+1=4$ $x[3][5]=x[3][4]+x[3][1]=4+1=5$ (Since each of x[0][1]+x[0][1], x[0][2]+x[0][1], x[0][3]+x[0][1], x[0][4]+x[0][1] is smaller than p−1, the value is output as is.)

$x[4][0]=0$ $x[4][1]=5$ $x[4][2]=x[4][1]+x[4][1]-(p-1)=5+5-6=4$ $x[4][3]=x[4][2]+x[4][1]-(p-1)=4+5-6=3$ $x[4][4]=x[4][3]+x[4][1]-(p-1)=3+5-6=2$ $x[4][5]=x[4][4]+x[4][1]-(p-1)=2+5-6=1$ (Since each of x[0][1]+x[0][1], x[0][2]+x[0][1], x[0][3]+x[0][1], x[0][4]+x[0][1] is larger than p−1, p−1 is subtracted from the value.)

Finally, U[i] [j] is calculated based on x[i][j], s[i], and Equation (1).

Calculation Process 4

$U[0][0]=s[x[0][0]]=s[0]=1$ $U[0][1]=s[x[0][1]]=s[5]=5$ $U[0][2]=s[x[0][2]]=s[4]=4$ $U[0][3]=s[x[0][3]]=s[3]=6$ $U[0][4]=s[x[0][4]]=s[2]=2$ $U[0][5]=s[x[0][5]]=s[1]=3$ $U[1][0]=s[x[1][0]]=s[0]=1$ $U[1][1]=s[x[1][1]]=s[1]=3$ $U[1][2]=s[x[1][2]]=s[2]=2$ $U[1][3]=s[x[1][3]]=s[3]=6$ $U[1][4]=s[x[1][4]]=s[4]=4$ $U[1][5]=s[x[1][5]]=s[5]=5$ $U[2][0]=s[x[2][0]]=s[0]=1$ $U[2][1]=s[x[2][1]]=s[5]=5$ $U[2][2]=s[x[2][2]]=s[4]=4$ $U[2][3]=s[x[2][3]]=s[3]=6$ $U[2][4]=s[x[2][4]]=s[2]=2$ $U[2][5]=s[x[2][5]]=s[1]=3$ $U[3][0]=s[x[3][0]]=s[0]=1$ $U[3][1]=s[x[3][1]]=s[1]=3$ $U[3][2]=s[x[3][2]]=s[2]=2$ $U[3][3]=s[x[3][3]]=s[3]=6$ $U[3][4]=s[x[3][4]]=s[4]=4$ $U[3][5]=s[x[3][5]]=s[5]=5$ $U[4][0]=s[x[4][0]]=s[0]=1$ $U[4][1]=s[x[4][1]]=s[5]=5$ $U[4][2]=s[x[4][2]]=s[4]=4$ $U[4][3]=s[x[4][3]]=s[3]=6$ $U[4][4]=s[x[4][4]]=s[2]=2$ $U[4][5]=s[x[4][5]]=s[1]=3$

In processors used in mobile telephones and the like, limitations in their circuit size often force them to perform the remainder calculations digit by digit. When a processor has a data width of 16 bits, 16 clocks are required for the calculation of each row of y[i] (step 43 in FIG. 2) in Calculation Process 1. Further, assuming that two clocks are required for a conditional branch (step 45) in FIG. 2, and one clock is required for other processing (step 44) in FIG. 2, 19 clocks are required for each execution of step 43 to step 45 in FIG. 2. As a result, Calculation Process 1 requires a total of 19*R clocks (since the maximum value of R is 20, 380 clocks are required at maximum).

SUMMARY OF THE INVENTION

It is an object of the present invention to significantly reduce the number of clocks required to calculate y[i] in Calculation Process 1 to save the processing time of Calculation Process 1.

To achieve the above object, the present invention relies only on addition and subtraction, instead of a remainder calculation, in calculating y[i] in Calculation Process 1. Specifically, the following calculations are made.

As can been seen from FIGS. 1A, 1B, $q[i+1]-q[i]<p-1$ stands for all prime numbers p, so that when z[i] is defined as follows:

$$z[i]=\text{floor}(q[i]/(p-1))*(p-1) \quad (6)$$

where floor $(q[i]/(p-1))$ is the quotient of $q[i]/(p-1)$ the following inequalities are established:

$$z[i] \leq q[i] < (z[i])+(p-1)$$

$$z[i] \leq q[i] < q[i+1] < q[i]+(p-1) < z[i]+2*(p-1) \quad (7)$$

Thus, z[i] is represented by:

$z[0]=0;$ $z[i]=z[i-1]$ when $q[i]<z[i-1]+p-1;$ and $z[i]=z[i-1]+p-1$ when $q[i] \geq z[i-1]+p-1,$ (8)

where $i=1, \ldots, R-1$

This is sequentially calculated from i=1, thereby deriving z[i] only with addition and subtraction, without the need for a remainder calculation. Then, the following calculation is carried out to thereby obtain y[i] only with addition and subtraction, without remainder calculation:

$$y[i]=q[i]-z[i] \quad (9)$$

As described above, the present invention makes it possible to reduce the operating time of a processor because of no need of the remainder calculation, which requires a large number of clocks to calculate y[i]. The reduction in the operating time of the processor can lead to saving power consumed by the processor. Further, the elimination of the remainder calculator in turn allows the circuit size of the apparatus to be reduced, as compared with an apparatus which includes the remainder calculator. The reduction in the circuit scale of the apparatus can in turn contribute to a reduction in the power consumed by the apparatus.

The above and other objects, features and advantages of the present invention will become apparent from the following description with reference to the accompanying drawings which illustrate examples of the present invention.

BRIEF DESCRIPTION OF THE DRAWINGS

FIGS. 1A, 1B are tables exemplifying values of prime number sequence p[i] for each value of prime number p when an interleaver has the number of rows R equal to 20 (R=20);

DETAILED DESCRIPTION OF THE PREFERRED EMBODIMENTS

While a method of calculating y[i] according to the present invention is performed as described in SUMMARY OF THE INVENTION, the following description will be made using a specific example.

Again, set parameters used herein are the same as those used in Description of the Related Art. The calculation of y[i] corresponding to Calculation Process 1 in Description of the Related Art is made based on the set parameters, Equation (8), and Equation (9).

First, z[i] is calculated based on Equation (8), prime number sequence q[i], and prime number p.

Calculation of z[i]

$z[0]=0$

Since $7=q[1] \geq z[0]+p-1=6, z[1]=z[0]+p-1=6$

Since $11=q[2]<z[1]+p-1=12, z[2]=z[1]=6$

Since $13=q[3] \geq z[2]+p-1=12, z[3]=z[2]+p-1=12$

Since $17=q[4]<z[3]+p-1=18, z[4]=z[3]=12$

Next, y[i] is calculated based on z[i] and q[i] determined during the calculation of z[i], and Equation (9):

Calculation of y[i]

$y[0]=q[0]-z[0]=1-0=1$ $y[1]=q[1]-z[1]=7-6=1$ $y[2]=q[2]-z[2]=11-6=5$ $y[3]=q[3]-z[3]=13-12=1$ $y[4]=q[4]-z[4]=17-12=5$

The calculated result matches the result derived by Calculation Process 1 in Description of the Related Art.

Subsequently, U[i][j] is determined by performing completely the same calculations in Calculation Process 2 to Calculation Process 4 in Description of the Related Art. No remainder calculation is included in Calculation Process 2 to Calculation Process 4.

In the following, a detailed description will be made of an interleave parameter processing apparatus which employs the foregoing method of calculating y[i].

Figure 2:
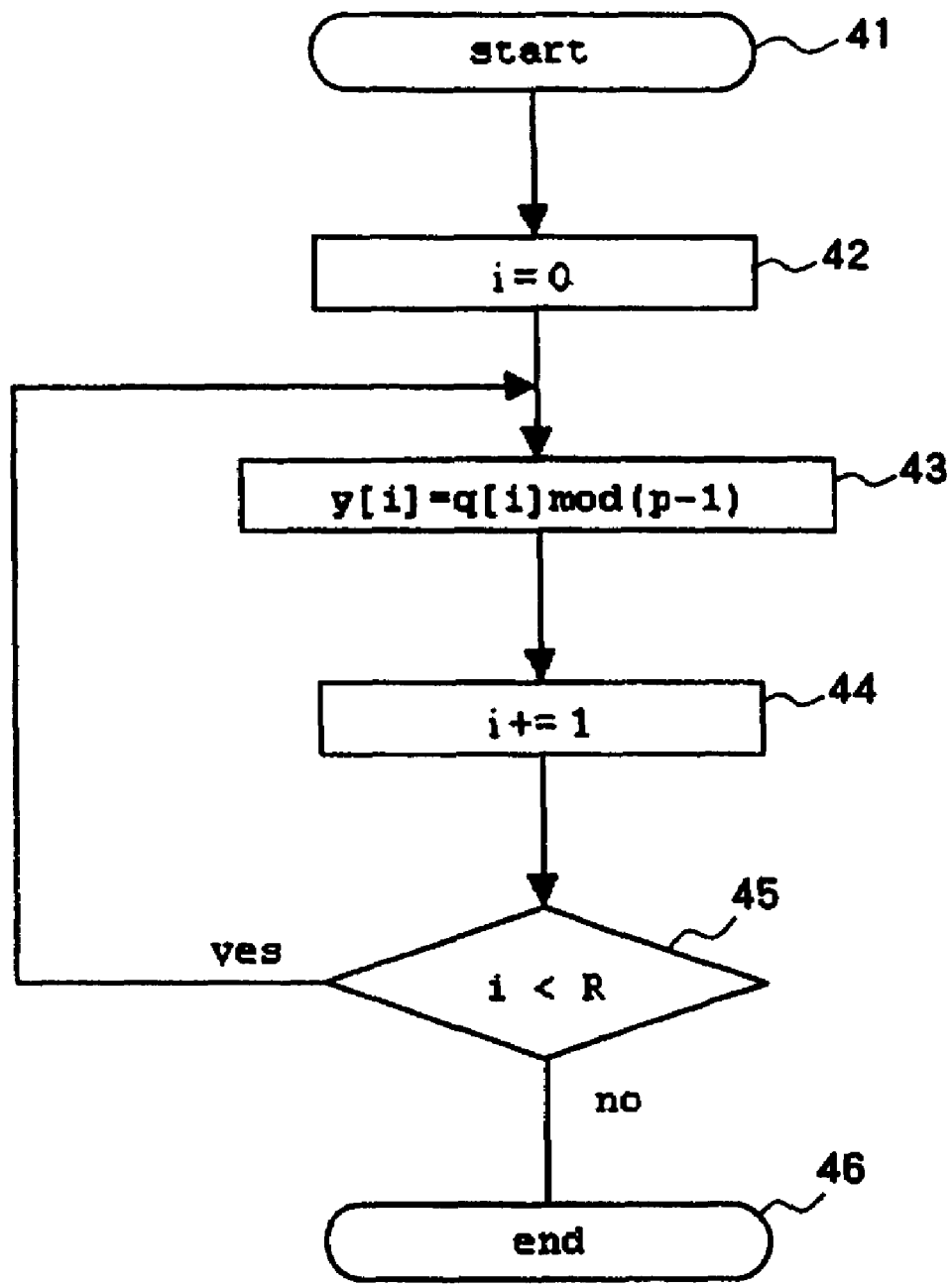
FIG. 2 is a flow chart illustrating a procedure for calculating y[i] according to the prior art.
Figure 3:
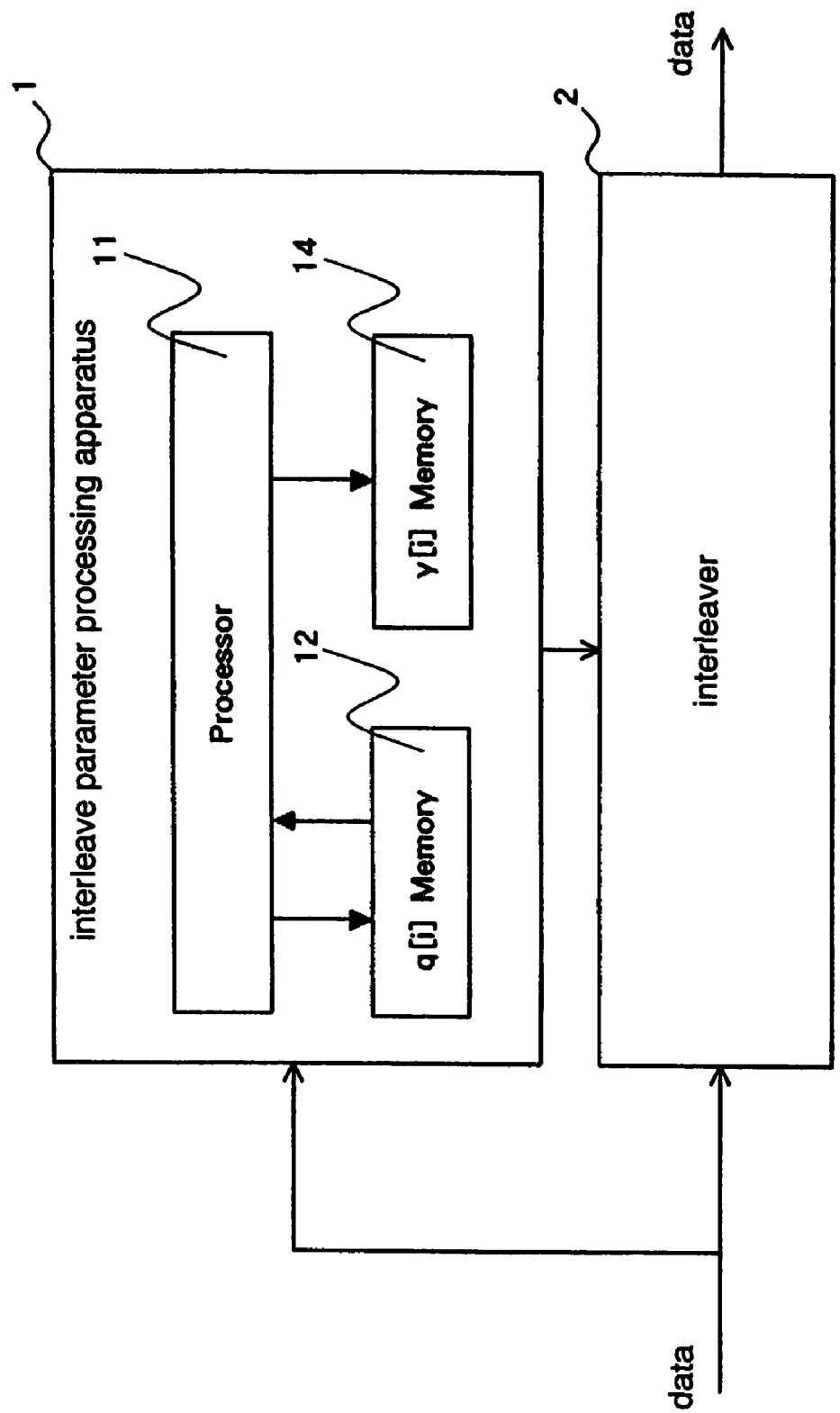
FIG. 3 is a block diagram illustrating the configuration of one embodiment of the present invention.

Referring to FIG. 3, there is illustrated a configuration of the interleave parameter processing apparatus according to an embodiment of the present invention. Interleave parameter processing apparatus 1 comprises processor 11, q[i] memory 12, and [i] memory 14. Interleave parameter processing apparatus 1 and interleaver 2 may be mounted in a mobile telephone and the like.

Interleave parameter processing apparatus 1 receives data to be transmitted, and determines the data length of the data. Processor 11 calculates prime number p, s[j], T[i], q[i], then intermediate value y[i], and U[i][j] from the determined data length. Processor 11 stores calculated q[i] and y[i] in q[i] memory 12 and y[i] memory 14, respectively. Then, interleave parameter processing apparatus 1 outputs U[i][j] and T[i] to interleaver 2.

Interleaver 2 receives data to be transmitted, encodes the data based on U[i][j] and T[i] received from interleave parameter processing apparatus 1, and outputs the encoded data.

Figure 4:
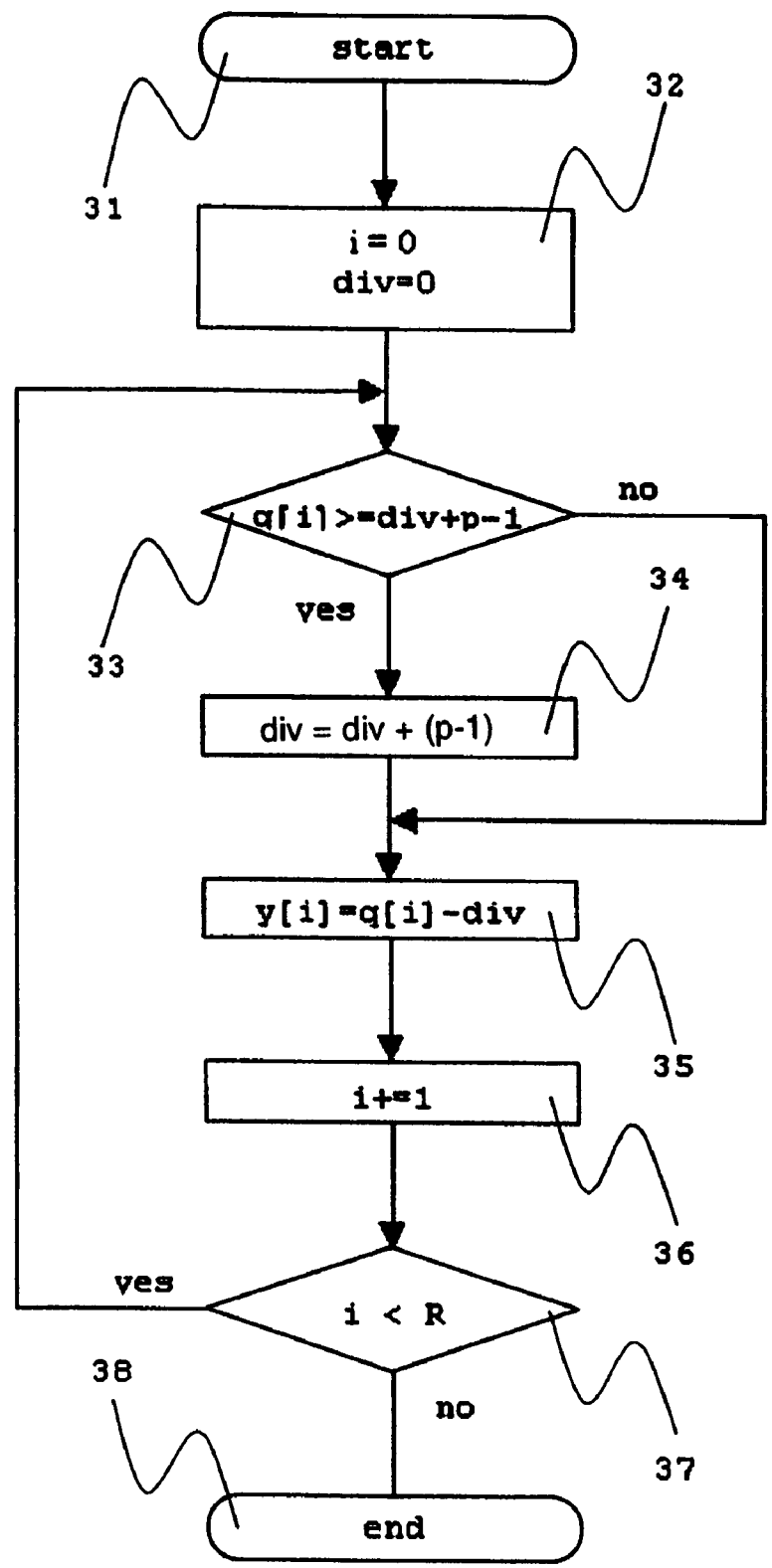
FIG. 4 is a flow chart illustrating a procedure for calculating y[i] according to the present invention.

Referring to FIG. 4, there is illustrated a flow chart which represents a routine for calculating y[i] among calculations performed by processor 11 according to the present invention, described above.

At step 32, processor 11 initializes index i and variable div to zero, variable div corresponding to z[i]. At step 33, processor 11 makes a determination corresponding to Equation (8). When q[i]≧div+p−1, p−1 is added to the value of div at step 34. When q[i]<div+p−1, the routine proceeds to step 35 without further processing. At step 35, processor 11 calculates y[i] from y[i]=q[i]−div. At step 36, processor 11 increments i, and iterates the processing from step 33 to step 36 until i equals to R at step 37.

Here, since a conditional branch (steps 33, 37) takes two clocks, and other processing (steps 34, 35, 36) takes one clock, seven clocks are required for each iteration from step 33 to step 37. As discussed in Description of the Related Art, the prior art method requires 19 clocks for each iteration, the reduction of 12 clocks of the processing is achieved. Since R has the maximum value of 20, up to 240 clocks of the processing can be reduced.

Figure 5:
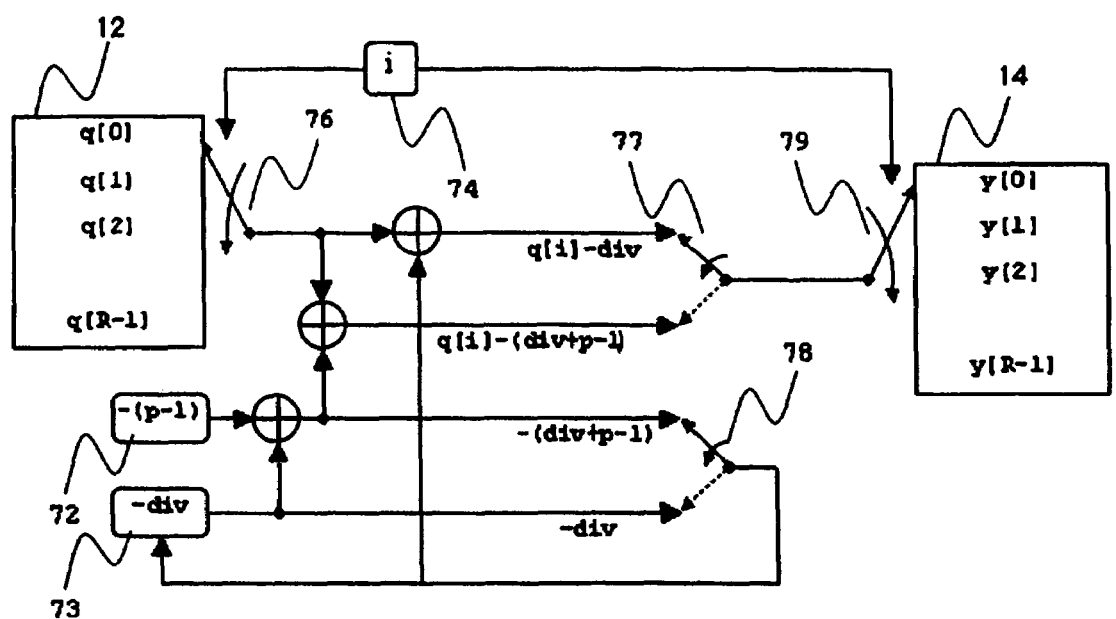
FIG. 5 is a diagram illustrating an exemplary implementation of an interleave parameter processing apparatus.

Referring to FIG. 5, there is illustrated an exemplary implementation of interleave parameter processing apparatus 1.

Memory 12 stores values of q[i]. Constant block 72 has the value of −(p−1). Register 73 has the value of −div. Register 74 generates a memory address. Memory 14 stores values of y[i]. Selector 76 selects the value of address i in memory 12. Selector 77 selects an output in accordance with the value of q[i]−div or q[i]−(div+p−1). Selector 78 selects an output in accordance with the value of −(div+p−1) or −div. Selector 79 selects a location in memory 14 in which data is to be stored.

Next, a description will be made of the operation of interleave parameter processing apparatus 1 in this exemplary implementation. Initially, counter 74 and register 73 hold therein zero as the value of i and div, respectively. Selector 76 selects data q[i] at address i in memory 12. q[i]−(div+p−1) is calculated with value−div in register 73 and value−(p−1) in constant block 72. When q[i]−(div+p−1)<0, selectors 77, 78 select q[i]−div, −div, respectively, and otherwise select q[i]−(div+p−1), −(div+p−1), respectively. The value selected by selector 77 is stored in memory 14 at address i, while the value selected by selector 78 is stored in register 73. The foregoing processing is repeated until value i in counter 74 equals to R−1. With the above processing, y[i] is generated in memory 14.

Other than an implementation by dedicated hardware, interleave parameter processing apparatus 1 may be implemented by recording a program for embodying its functions on a computer readable recording medium, and loading the program recorded on the recording medium into a computer which should act as interleave parameter processing apparatus 1 so that the computer executes the program. The computer readable recording medium refers to a recording medium such as a flexible disk, a magneto-optical disk, a CD-ROM and the like, and a storage device such as a hard disk drive contained in a computer system, and the like. Further, the computer readable recording medium also includes one which holds a program for a certain period of time, such as a volatile memory within a computer system.

While preferred embodiments of the present invention have been described using specific terms, such description is for illustrative purposes only, and it is to be understood that changes and variations may be made without departing from the spirit or scope of the following claims.

What is claimed is:

1. In a transmission apparatus comprising an interleave parameter processing apparatus configured to supply an interleaver for a turbo code defined by 3GPP TS25.212 which is a standard of IMT2000 with an intra-row permutation pattern U[i][j] and an inter-row permutation pattern T[i] required by said interleaver for encoding data to be transmitted, an interleave parameter processing method for calculating y[i]=q[i]×mod(p−1) which is an intermediate value in a process in which said interleave parameter processing apparatus calculates the intra-row permutation pattern U[i][j] based on the inter-row permutation pattern T[i], a prime number p, a base sequence s[j], and a prime number sequence q[i] determined from the length of the transmission data, said method comprising:

a) initializing an index i and a variable div to zero;
b) adding p−1 to the value of div and storing the resulting value when q[i]≧div+p−1, and storing the value of div as is when q[i]<div+p−1;
c) calculating y[i] in accordance with y[i]=q[i]−div based on the value of div stored at step b);
d) incrementing i until i equals to the number R of rows of said interleaver to repeat step b) and step c) to calculate y[i] for all i;
e) encoding said data based on said intra-row permutation and said inter-row permutation using said interleaver; and
f) transmitting said encoded data using said transmission apparatus, wherein said method is performed on a processor in said transmission apparatus.

2. A transmission apparatus comprising an interleave parameter processing apparatus for supplying an intra-row permutation pattern U[i][j] and an inter-row permutation pattern T[i] to an interleaver for a turbo code defined by 3GPP TS25.212 which is a standard of IMT2000, said interleave parameter processing apparatus configured to calculate y[i]=q[i]×mod(p−1) which is an intermediate value in a process of calculating the intra-row permutation pattern U[i][j] based on the inter-row permutation pattern T[i], a prime number p, a base sequence s[j], and a prime number sequence q[i] found from the length of the transmission data, said interleave parameter processing apparatus comprising:

means for initializing an index i and a variable div to zero;
means for adding p−1 to the value of div and storing the resulting value when q[i]≧div+p−1, and storing the value of div as is when q[i]<div+p−1;
means for calculating y[i] from y[i]=q[i]−div based on the value of div stored by said adding means;
means for incrementing i until i equals to the number R of rows of said interleaver, and causing said adding means and said calculating means to repeat the associated processing to calculate y[i] for all i;

means for encoding said data based on said intra-row permutation and inter-row permutation using said interleaver; and means for transmitting said encoded data using said transmission apparatus;

wherein said means for initializing, means for adding, means for calculating, means for incrementing, means for encoding and means for transmitting are implemented on a processor in said transmission apparatus.

3. A mobile telephone comprising the transmission apparatus according to claim 2.

4. In a transmission apparatus comprising an interleave parameter processing apparatus configured to supply an interleaver for a turbo code defined by 3GPP TS25.212 which is a standard of IMT2000 with an intra-row permutation pattern U[i][j] and an inter-row permutation pattern T[i] required by said interleaver for encoding data to be transmitted, a computer program for enabling a computer to calculate y[i]=q[i]×mod(p−1) which is an intermediate value in a process in which said interleave parameter processing apparatus calculates the intra-row permutation pattern U[i][j] based on the inter-row permutation pattern T[i], a prime number p, a base sequence s[j], and a prime number sequence q[i] determined from the length of the transmission data, said program comprising:

a first set of instructions for initializing an index i and a variable div to zero;

a second set of instructions for adding p−1 to the value of div and storing the resulting value when q[i]≧div+p−1, and storing the value of div as is when q[i]<div+p−1;

a third set of instructions for calculating y[i] in accordance with y[i]=q[i]−div based on the value of div stored at step b);

a fourth set of instructions for incrementing i until i equals to the number R of rows of said interleaver to repeat the executions of said second and third set of instructions to calculate y[i] for all i;

a fifth set of instructions for encoding said data based on said intra-row permutation and said inter-row permutation using said interleaver; and a sixth set of instructions for transmitting said encoded data using said transmission apparatus, wherein said program is performed on a processor in said transmission apparatus.

5. An apparatus for interleaving and transmitting data according to a turbo code defined by 3GPP TS25.212 which is a standard of IMT2000, comprising an interleaver which interleaves data using an intra-row permutation pattern U[i][j] and an inter-row permutation pattern T[i], a processor which calculates y[i]=q[i]×mod(p−1) as an intermediate value to calculate U[i][j] without using a division or remainder operation, an encoder which encodes said data based on said intra-row permutation and inter-row permutation and a transmitter which transmits said encoded data, wherein p is a prime number, and q[i] is a prime number sequence determined from the length of the transmission data.

6. A transmission apparatus, comprising a turbo coding apparatus that uses an interleaver for encoding data to be transmitted according to a turbo code defined by IMT2000 standard 3GPP TS25.212; said interleaver having an intra-row permutation pattern U[i][j] and an inter-row permutation pattern T[i], which said interleaver uses for encoding said data to be transmitted; intermediate value y[i]=q[i]×mod(p−1) is used to calculate the intra-row permutation pattern U[i][j] based on the inter-row permutation pattern T[i], a prime number p, a base sequence s[j], and a prime number sequence q[i] (determined from the length of the transmission data), wherein the turbo coding apparatus uses a method to calculate the intermediate value y[i]=q[i]×mod(p−1) which does not require the remainder operator, said method comprising:

a) initializing an index i and a variable div to zero;

b) adding p−1 to the value of div and storing the resulting value when q[i]≧div+p−1, and storing the value of div as is when q[i]<div+p−1;

c) calculating y[i] in accordance with y[i]=q[i]−div based on the value of div stored at step b);

d) incrementing i until i equals to the number R of rows of said interleaver to repeat step b) and step c) to calculate y[i] for all i;

e) encoding said data based on said intra-row permutation and said inter-row permutation using said interleaver; and f) transmitting said encoded data using said transmission apparatus, wherein said method is performed on a processor in said transmission apparatus.

7. In a transmission apparatus having an interleave parameter processing apparatus configured to supply an interleaver for a turbo code with an intra-row permutation pattern U[i][j] and an inter-row permutation pattern T[i] required by said interleaver for encoding data to be transmitted, wherein the interleave parameter processing apparatus performs a method of encoding and transmitting data using y[i]=q[i]×mod(p−1) which is an intermediate value in a process in which said interleave parameter processing apparatus calculates the intra-row permutation pattern U[i][j] based on the inter-row permutation pattern T[i], a prime number p, a base sequence s[j], and a prime number sequence q[i] determined from the length of the transmission data, said method comprising:

a) initializing an index i and a variable div to zero;

b) adding p−1 to the value of div and storing the resulting value when q[i]≧div+p−1, and storing the value of div as is when q[i]<div+p−1;

c) calculating y[i] in accordance with y[i]=q[i]−div based on the value of div stored at step b);

d) incrementing i until i equals to the number R of rows of said interleaver to repeat step b) and step c) to calculate y[i] for all i;

e) encoding said data based on said intra-row permutation and said inter-row permutation using said interleaver; and f) transmitting said encoded data using said transmission apparatus, wherein said method is performed on a processor in said transmission apparatus.

8. An apparatus for interleaving and transmitting data according to a turbo code, comprising an interleaver which interleaves data using an intra-row permutation pattern U[i][j] and an inter-row permutation pattern T[i], a processor which calculates y[i]=q[i]×mod(p−1) as an intermediate value to calculate U[i][j] without using a division or remainder operation, an encoder which encodes said data based on said intra-row permutation and inter-row permutation and a transmitter which transmits said encoded data, wherein p is a prime number, and q[i] is a prime number sequence determined from the length of the transmission data.

* * * * *